(12) United States Patent
Fischer et al.

(10) Patent No.: US 11,204,654 B2
(45) Date of Patent: Dec. 21, 2021

(54) ORGANIC HAPTIC INTERFACE

(71) Applicant: fm marketing gmbh, Neumarkt am Wallersee (AT)

(72) Inventors: Thomas Fischer, Bayerisch Gmain (DE); Ferdinand Maier, Neumarkt am Wallersee (AT)

(73) Assignee: fm marketing gmbh

( * ) Notice: Subject to any disclaimer, the term of this patent is extended or adjusted under 35 U.S.C. 154(b) by 421 days.

(21) Appl. No.: 15/678,624

(22) Filed: Aug. 16, 2017

(65) Prior Publication Data

US 2018/0052530 A1    Feb. 22, 2018

(30) Foreign Application Priority Data

Aug. 16, 2016 (DE) .................... 10 2016 115 210.2

(51) Int. Cl.
| | |
|---|---|
| *G06F 3/0488* | (2013.01) |
| *G06F 3/038* | (2013.01) |
| *G06F 3/0482* | (2013.01) |
| *G06F 9/44* | (2018.01) |
| *G06F 3/0489* | (2013.01) |
| *H04N 21/422* | (2011.01) |
| *G06F 3/0338* | (2013.01) |
| *H04N 21/47* | (2011.01) |
| *G06F 3/0484* | (2013.01) |
| *G06F 9/4401* | (2018.01) |

(52) U.S. Cl.
CPC ............ *G06F 3/038* (2013.01); *G06F 3/0338* (2013.01); *G06F 3/0383* (2013.01); *G06F 3/0482* (2013.01); *G06F 3/0484* (2013.01); *G06F 3/0488* (2013.01); *G06F 3/04892* (2013.01); *G06F 9/4416* (2013.01); *H04N 21/42204* (2013.01); *H04N 21/42206* (2013.01); *H04N 21/47* (2013.01); *G06F 2203/0384* (2013.01)

(58) Field of Classification Search
CPC ...... G06F 3/04883; G06F 3/14; G06F 3/0488; G06F 3/038; G06F 3/04892; G06F 3/0482; G06F 3/0338; G06F 3/0383; G06F 3/0484; G06F 9/4416; G06F 2203/0384; H04M 1/6091; H04W 84/12; H04N 21/47; H04N 21/42204; H04N 21/42206
See application file for complete search history.

(56) References Cited

U.S. PATENT DOCUMENTS

| | | | | |
|---|---|---|---|---|
| 5,670,955 A * | 9/1997 | Thorne, III | ........... | G06F 3/0338 178/18.03 |
| 5,815,139 A * | 9/1998 | Yoshikawa | ........... | G06F 3/0338 345/157 |
| 7,402,764 B2 * | 7/2008 | Pihlaja | .................. | G06F 3/0338 200/5 R |

(Continued)

*Primary Examiner* — Cesar B Paula
*Assistant Examiner* — Zelalem "Zee" Shalu
(74) *Attorney, Agent, or Firm* — Stinson LLP

(57) ABSTRACT

A method for navigating a focus element for highlighting menu items of a menu bar on a screen by a deflection of an actuation device on a remote control, comprising detecting a first control signal dependent on a degree of deflection of the actuation device and a second control signal dependent on an actuation force with which the actuation device is deflected; and shifting the focus element and menu items relative to each other depending on a comparison of the second control signal and a predetermined condition, if the first control signal is detected.

11 Claims, 2 Drawing Sheets

(56) References Cited

U.S. PATENT DOCUMENTS

| | | | | |
|---|---|---|---|---|
| 7,534,973 | B2* | 5/2009 | Voelckers | G06F 3/0234 |
| | | | | 200/5 R |
| 2007/0002018 | A1* | 1/2007 | Mori | G06F 1/1626 |
| | | | | 345/158 |
| 2007/0290994 | A1 | 12/2007 | Kawasaki et al. | |
| 2010/0177057 | A1* | 7/2010 | Flint | G06F 3/0416 |
| | | | | 345/174 |
| 2013/0063339 | A1 | 3/2013 | Maier | |
| 2013/0286293 | A1 | 10/2013 | Katsuyama | |
| 2015/0185840 | A1* | 7/2015 | Golyshko | G06F 3/04842 |
| | | | | 715/702 |
| 2016/0179463 | A1* | 6/2016 | Higa | H04N 21/42222 |
| | | | | 725/52 |

* cited by examiner

ORGANIC HAPTIC INTERFACE

REFERENCE TO RELATED APPLICATION

This application claims priority to German patent application DE 10 2016 115 210.2 filed on Aug. 16, 2016, the entire disclosure of which is incorporated by reference.

FIELD OF THE INVENTION

The present invention concerns a method for controlling a focus element on a screen and a control device for performing the method.

BACKGROUND

A method is known from EP 2 568 369 A1 for navigating a focus element to highlight menu items of a menu bar on a screen by deflecting an actuation device on a remote control. The menu bar in this method is designed as a card box with index cards one after the other with the focus element as the largest index card in the foreground. In the method, a first control signal dependent on a degree of deflection of the actuation device is detected and the focus element and menu items are moved relative to each other depending on when the first control signal is detected. In the method, the focus element remains and is always in the foreground at the same place, while the index cards are pushed through by the focus element.

SUMMARY OF THE INVENTION

The object of the invention is to improve the known method.

Briefly, therefore, the invention in one aspect is directed to a method for navigating a focus element for highlighting menu items of a menu bar on a screen by a deflection of an actuation device on a remote control comprising detecting of a first control signal dependent on a degree of deflection of the actuation device and a second control signal dependent on an actuation force with which the actuation device is deflected; and shifting the focus element and menu items relative to each other depending on a comparison of the second control signal and a predetermined condition if the first control signal is detected.

In another aspect, the invention is directed to a control device arranged to perform the foregoing method.

In a further aspect, the invention is directed to a computer program comprising program code to perform all the steps of this method.

DETAILED DESCRIPTION OF PREFERRED EMBODIMENTS

Figure 1:
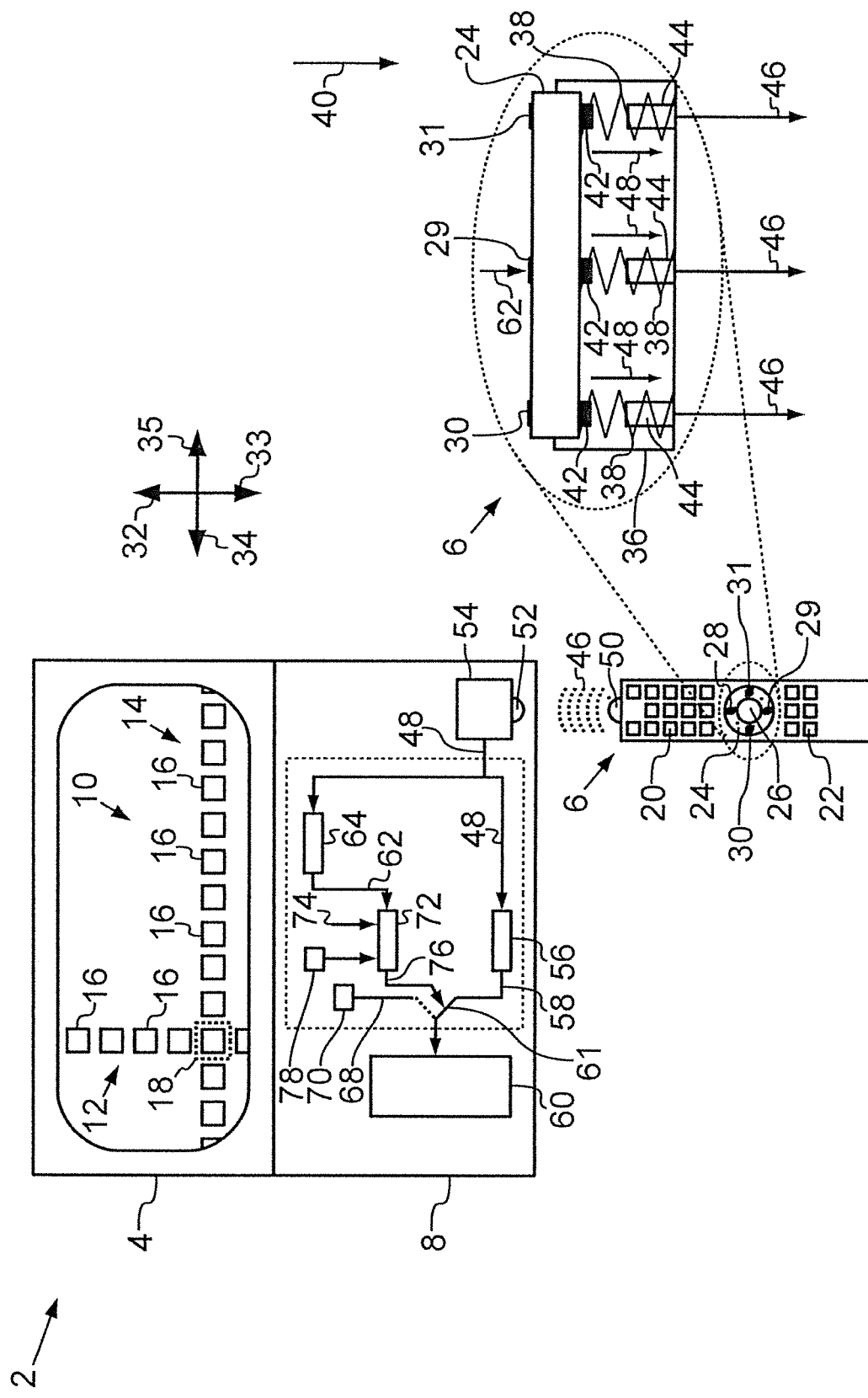
FIG. 1: a schematic representation of a multimedia arrangement with a screen and a remote control.

According to one aspect of the invention, a method for navigating a focus element for highlighting menu items of a menu bar on a screen by deflecting an actuation device on a remote control comprises the steps of detection of a first control signal dependent on a degree of deflection of the actuation device and a second control signal dependent on an actuation force with which the actuation device is deflected, and shifting the focus element and menu items relative to each other depending on a comparison of the second control signal and a predetermined condition if the first control signal is detected.

The method indicated is based on the consideration that in the method named above the actuation device is designed as a slider and can be shifted one-dimensionally in the longitudinal direction on the remote control. The menu bar operated by the slider can also be shifted only one-dimensionally through the focus element. For the slider on the remote control a relatively long displacement path with a large number of different intermediate positions can be realized this way, with a finely graduated speed setting of the focus element with the slider possible when navigating through the menu. But the shorter the displacement path available for the actuation device, the fewer intermediate positions are available for the speed setting of the focus element. For users with a less sensitive touch in particular, with short displacement paths it is hard to precisely control or set an intermediate position corresponding to a desired speed with the actuation device.

If in addition the actuation device is not slid as a slider relocatable parallel to the remote control surface but is designed as a button that can be pressed perpendicular to the remote control surface, then added to the short displacement path is the fact that when performing a pressing movement a person usually has less sensitive motor feeling than with a sliding movement. As a result, in a large number of application cases the method described initially is unsuitable for users with less-sensitive motor skills.

Granted, the effort could be made to assure the user-friendliness of the method described initially by providing a sufficiently large displacement path for a broadest possible range of users, but given the limited space on a remote control this is not always possible. In particular, when the focus element additionally must be controlled in multiple menu directions, for space reasons buttons must be used as actuation devices that in principle allow no large displacement path.

To be able nonetheless to use the basic ideas of a focus element on a remote control with controllable speed in accordance with the method name above, with the indicated method it is proposed using not just the control signal for variable-speed control of the focus element in the menu but also another, second control signal showing the force with which the user operates the actuation device.

This proposal is based on the consideration that a user with less-sensitive motor skills has insufficient control over the intermediate positions named above because, in operating the actuation device, he normally cannot exert a suitable force control to stop at an intermediate position necessary for a desired speed and then release the actuation device again at the right moment when the focus element is on a desired menu item. Viewed in terms of control technology, when setting the menu bar speed relative to the focus element such a user behaves like a PT2 member, which is why he is hardly able to reach the intermediate position he desires and thus the speed he wants before the focus element has reached the menu item he wishes. As a result, the user suspends the movement between focus element and menu bar either too soon or too late and therefore never reaches the menu item he wants.

The method indicated offers the proposal here to move the focus element not just depending on the actuation device's degree of deflection but also depending on the actuation force. By considering the actuation force with which the user operates the actuation device, in navigating the focus element in the menu bar a user with poor force control as named above can be quickly detected and a suitable navigation and motion behavior for the user applied so that he can also stop at his desired menu item if he lacks sufficient force control over the actuation device.

In a refinement of the indicated method, the actuation device is a button. In this way a space-saving directional pad can be situated on the remote control with which the focus element can be moved in any directions.

In an additional refinement of the indicated method, the predetermined condition is dependent on a predetermined force. In this way, the contrast indicated above can be made by a simple comparison of the actuation force contained in the second actuation signal and the predetermined actuation force.

One possibility for moving the focus element for a user as named above who is unable to exert sufficient control over the focus element's speed is to move the focus element in this case in discrete steps. As a result, the focus element and menu items are locally shifted relative to each other discretely by one menu item if the comparison of the second control signal and the predetermined condition corresponds to an actuation force greater than the predetermined force. However, if the comparison of the second control signal and the predetermined condition corresponds to an actuation force greater than the predetermined force, then the focus element and menu items can be shifted relative to each other depending on the degree of deflection of the actuation device.

In another refinement of the indicated method, the dependence of the displacement of the focus element on the comparison of the second control signal and the predetermined condition can be changed in terms of time. In this way, in defining the predetermined condition forces can also be considered that are actually necessary for steering toward an intermediate position. But if the user exerts such a force too quickly, that indicates a user as described above who cannot exert sufficient control over the focus element's speed. One possibility to design the dependence of the focus element's displacement on the comparison of the second control signal and the predetermined condition as dependent on time is to ignore the comparison of the second control signal and the predetermined condition upon expiration of a predetermined length of time in the displacement of the focus element. The focus element is then moved between the menu items with the speed dependent on the property of the first control signal after expiration of a predetermined length of time independent of the comparison of the second control signal and the predetermined condition.

In another refinement of the indicated method, the displacement of the focus element and the menu items relative to each other is dependent on the degree of deflection of the actuation device. In this case, the second control signal can be derived in terms of time from the first control signal because the acceleration of the actuation device, and therefore the actuation force, emerges directly from this derivation.

According to another aspect of the invention, a control device is arranged to perform one of the indicated methods.

In a refinement of the indicated device, the indicated device has a memory and a processor. The indicated method is stored in the memory in the form of a computer program and the processor is provided for performing the method when the computer program is loaded from the memory into the processor.

According to another aspect of the invention, a computer program comprises program code means to perform all steps of the indicated method when the program is run on an electronic device or on one of the indicated devices.

According to another aspect of the invention, a computer program product contains a program code that is stored on a computer-readable data carrier and performs the indicated method when it is run on a data processing device.

According to another aspect of the invention, a multimedia arrangement comprises a screen with a menu in which a focus element can be moved to select media, a remote control for controlling the focus element, and one of the indicated control devices. The indicated control device can be arranged on either the remote control or the screen.

The properties, features and advantages of this invention described above, and how these are achieved, become clearer in the context of the following description of the embodiments explained in further detail in connection with the drawing. In the figures, the same technical elements have the same reference numbers and are described only once. The figures are purely schematic, and above all do not reproduce the actual geometric ratios.

Reference is made to FIG. 1, which shows a multimedia arrangement 2 with a screen 4 and a remote control 6. Integrated into screen 4 of FIG. 1 is a media playback device 8, such as a set top box, although it is also provided independent of screen 4 and can be connected to it through a signal link.

Visual media such as movies, pictures or the like can be shown on screen 4 with media playback device 8. The selection and settings for playback of these media are done through a menu 10 shown in FIG. 1. The menu 10 shown and further explained below is purely exemplary and can be designed in any way. For example, an alternative menu can be learned from EP 2 568 369 A1.

In the embodiment here, menu 10 comprises a vertical menu bar 12 and a horizontal menu bar 14. The vertical menu bar 12 is comprised of a plurality of menu items 16 arranged vertically one over the other, while the horizontal menu bar 14 is comprised of a plurality of menu items 16 arranged horizontally next to each other. For the sake of clarity, not all of the menu items 16 are given their own reference signs in FIG. 1. Through the individual menu items 16 of the vertical menu bar 12 and the horizontal menu bar 14, either the media to be played back can be selected or the playback behavior for a selected medium can be set.

For this the two menu bars 12, 14 intersect in an intersection 18. Menu items 16 lying on this intersection 18 are considered selected and are clearly visible to the user as selected based on their position on intersection 18. Intersection 18 therefore serves as a focus element that highlights a selected menu item 16 for the user. A function behind a menu item 16 considered selected, such as a medium to be reproduced or a setting, can be activated through the remote control 6, e.g. by pressing a special button. Before addressing this further, the structure of remote control 6 should first be described further.

Remote control 6 comprises a first keypad 20 and a second keypad 22, both separated by a cursor ring 24 with an actuation button 26 lying in it centrally. The two keypads 20, 22 are not of further importance for explaining the embodiment.

For navigation in menu 10 and selection of a menu item 16, remote control 6 on cursor ring 24 looking into the image plane has an up direction key 28, a down direction key 29, a left direction key 30, and a right direction key 31. With the up direction key 28, the menu items 16 of vertical menu bar 12 are pushed upward through intersection 18 in a direction 32. With the down direction key 29, the menu items 16 of vertical menu bar 12 are pushed downward through intersection 18 in a direction 33. With the left direction key 30, the menu items 16 of horizontal menu bar 14 are shifted to the left through intersection 18 in a direction 34. With the right direction key 31, the menu items 16 of horizontal menu bar 14 are shifted to the right through intersection 18 in a direction 35. Menu items 16 lying inside intersection 18 are considered selected, as already explained, and are activated or deactivated with the actuation key 26.

To explain in greater detail the technical implementation of the menu management with the remote control cited above, the cursor ring 24 with the lower pushbutton 29, left pushbutton 30, and right pushbutton 31 in FIG. 1 are shown in an enlarged detail view in a side perspective.

The cursor ring 24 on its direction keys 28 to 31 is supported in a housing 36 of remote control 6 through reset elements 38. These reset elements 38 are designed here by way of example as springs. Alternative design possibilities, such as magnets arranged at opposite poles to each other, would be equally possible as reset elements 38. For the navigating of menu items 16 in menu 10 mentioned above, the user can press the direction keys 28 to 31 of cursor ring 24; after the user relaxes the pressure the reset elements 38 return the corresponding direction keys 28 to 31 back to an initial position.

In a pressure direction 40 of direction keys 28 to 31, seen below direction keys 28 to 31, in each case there is a sensor element 42; for example, in the form of a sensor magnet. In the pressure direction 40 seen below the sensor elements 42 is arranged a measuring sensor 44, which records a sensor field not further shown of sensor element 42 and converts it into a measurement signal 46. Since the strength of the sensor field permeating the given measuring sensor 44 depends on the position of sensor element 42 over measuring sensor 44, a measurement signal 46 can be generated that depends on a pressure depth 48 of the respective pressed direction key 28 to 31.

For navigation of menu 10, the measurement signal 46 dependent on pressure depth 48, together with an indicator not further visible pressed by direction keys 28 to 31, is then sent wirelessly from a transmitter in remote control 6 to a receiver 52 in media playback device 8 and there data processed to control the movement of menu bars 12, 14 explained above.

After the receiver 52, a filter device 54 initially derives the pressure depth 48 from measurement signal 46. The pressure depth 48 is then assigned a speed 58 with a speed characterization curve 56. Depending on which of the direction keys 28 to 31 suggests the indicator not further shown as pressed, the menu bars 12, 14 assigned to the direction keys 28 to 31 are then moved in the direction corresponding to the direction keys 28 to 31 pressed through intersection 18 at speed 58. The control of this movement can occur by a video control device 60 that furnishes the speed 58 through a switch 61 further described later. The user can adjust the speed 58 by changing the pressure depth 48. Once a menu item 16 desired by the user is located in intersection 18, he can release the pressed direction key 28 to 31 so that the correspondingly moved menu bar 12, 14 stops and the menu item 16 desired for selection comes to a stop in the intersection.

The advantage of being able to set the speed 58 through the pressure depth 48 of direction keys 28 to 31 is that the menu bars 12, 14 can be quickly moved if the menu item 16 desired for selection is still far from the focusing intersection 18. The menu bars 12, 14 can then be moved more slowly near the focusing intersection 18 so that the user can more easily release the correspondingly pressed direction keys 28 to 31 at the right moment.

Due to the reset element 38, the pressure depth 48 depends on a user force 62 with which the user presses the corresponding direction key 28 to 31 down on cursor ring 24. This user force is suggested in FIG. 1 on the down direction key 29. For users who due to lack of experience in handling remote control 6, lack of dexterity, or other reasons are unable to reasonably control user force 62 for setting pressure depth 48 and thus speed 58, however, it can be difficult with the system named above to reliably place a desired menu item 16 in the focusing intersection 18. To allow users to navigate in menu 10 with remote control 6 despite this without having to change the entire system, the speed 58 at which the menu items 16 of menu bars 12, 14 are moved through intersection 18 is also made dependent on user force 62 in addition to pressure depth 48. The background to this idea is explained in further detail below based on FIGS. 2 to 5.

Figure 2:
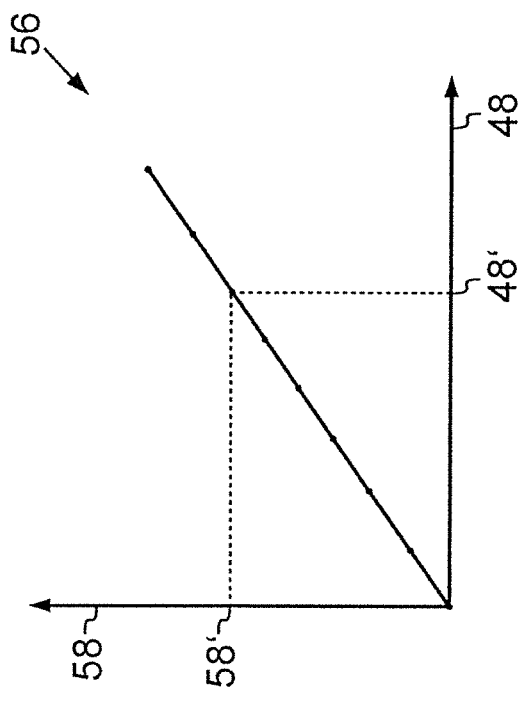
FIG. 2: a force-displacement curve when a button on the remote control of FIG. 1 is pressed.
Figure 3:
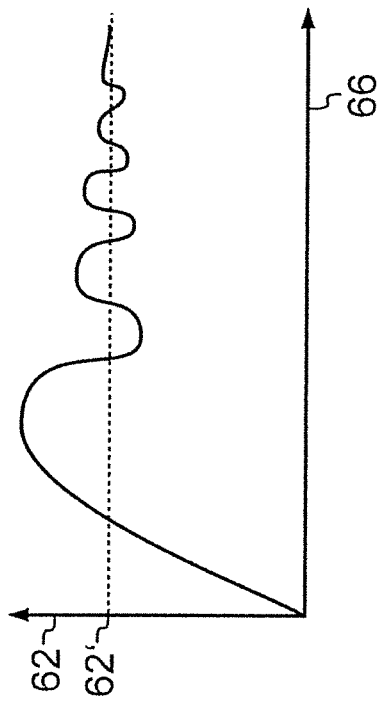
FIG. 3: a displacement-speed curve with which a focus element and a menu bar on the screen of FIG. 1 can be moved relative to each other when the button on the remote control of FIG. 1 is pressed.

From the characteristic curve 64 of reset element 38 of FIG. 2 in which user force 62 is compared to pressure depth 48, and the speed characteristic curve 56 of FIG. 3 in which pressure depth 48 is compared to speed 58, it is directly evident that to set a particular speed 58' the user must achieve a particular pressure depth 48' with a particular user force 62'.

Figure 4:
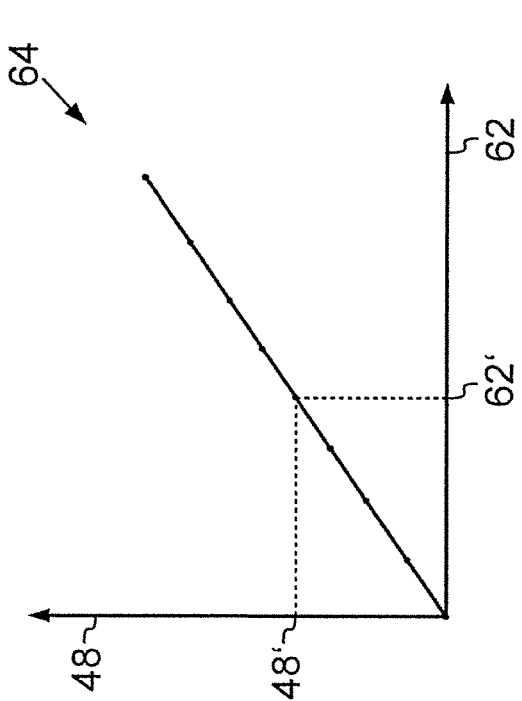
FIG. 4: a first time-wise force curve when a button on the remote control of FIG. 1 is pressed.

Viewed in terms of control technology, when setting the user force 62 an experienced user normally behaves like a PT1 member. This is shown in FIG. 4 over time 66. Viewed over time 66, the user steadily raises user force 62 and asymptotically approaches the user force 62' to be set for the desired speed 58'.

Figure 5:
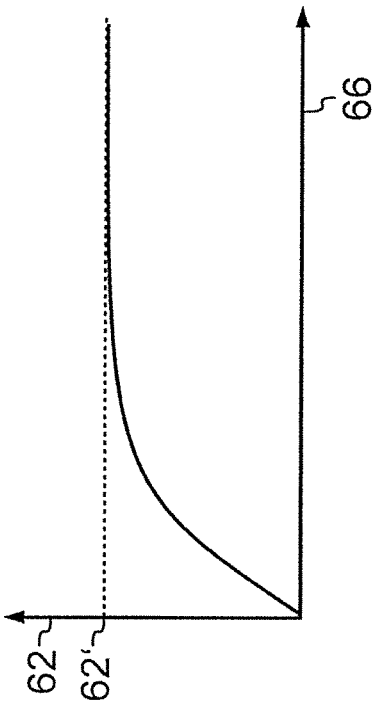
FIG. 5: a second time-wise force curve when a button on the remote control of FIG. 1 is pressed.

An inexperienced user behaves differently when setting the user force 62, as suggested in FIG. 5. Viewed in terms of control technology he behaves like a PT2 member and initially increases his user force too quickly. He thus exceeds the user force 62' to be set for the desired speed 58' and must constantly correct his user force 62. In the worst case, he never reaches the user force 62' to be set.

To nonetheless provide this user a menu 10 navigable with remote control 6, switch 61 is present in media playback device 8. Switch 61 switches the movement of menu items 16 of the two menu bars 12, 14 between two different movement principles. The first movement principle was described above and moves the menu items at a speed 58 depending on pressure depth 48 and thus actuation force 62. In the second approach, the menu items 16 are moved further by one menu item 16 in a direction 32 to 35 corresponding to the pressed direction key 28 to 31 if the user presses the corresponding direction key 28 to 31. Another movement of menu items 16 by another menu item step should only occur after the user has released a corresponding direction key 28 to 31 and pressed again.

A corresponding movement scheme 68 can be stored in a memory 70 and selected through switch 61 in the manner below if the user's actuation force 62 suggests a behavior like a PT2 member.

For this, in the embodiment here after the reception in media playback device 8 the pressure depth 48 is converted back to actuation force 62 based on the known characterization curve 64 of reset element 38. This actuation force 62 is then compared with a predetermined actuation force 74 in an analysis block 72.

For the comparison, in the embodiment here the actuation force 62 is compared with the predetermined actuation force 74. As long as the user's actuation force 62 is less than the predetermined actuation force 72, analysis block 72 controls switch 61 with a triggering signal such that the movement of menu items 16 is based on speed 58. If the user's actuation force 62 exceeds the predetermined actuation force 74, then the movement of menu items 16 is based on the movement scheme 68 from memory 70.

Optionally, a timer 78 can be present that deactivates the action of analysis block 72 upon expiration of a particular length of time and such that the movement of menu items 16 is permanently based on speed 58. This means it is thus taken into consideration whether the user force within a certain amount of time exceeds the predetermined user force 74. As a result, predetermined user force 74 is not considered an absolute criterion but instead a predetermined particular increase in force together with the length of time. Based on a user's excessive increase in force, his user behavior not only can be correctly assessed much sooner but also with lower thresholds for the actuation force 62.

In FIG. 1, the elements between receiver 54 and video control device 60 that perform the method described above are bordered by a dotted line. The procedural steps suggested within this border need not necessarily be performed in media playback device 8. It would be equally conceivable to perform the steps bordered by a dotted line in remote control 6 and then, instead of pressure depth 48, transmit speed 58 or movement scheme 68 depending on the position of switch 61. If the steps circled by a dotted line are interpreted as a control device, this can therefore be arranged arbitrarily on the side of either screen 4 or the remote control.

For performing the method explained above, function units, switches, and the like were chosen merely for the sake of clarity and represent no restriction. The overall method can be realized as desired; for example, also in the form of a computer program.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

The invention claimed is:

1. A method for navigating a focus element for highlighting menu items of a menu bar on a screen by a deflection of an actuation device on a remote control, the method comprising:

measuring, by a measuring sensor, a pressure depth, the pressure depth indicating a degree of deflection of the actuation device when a user applies an actuation force to the actuating device;

detecting a first control signal dependent on the degree of deflection of the actuation device;

detecting a second control signal dependent on the actuation force with which the actuation device is deflected; and in response to detecting the first control signal, shifting the focus element and menu items relative to each other depending on a comparison of the second control signal and a predetermined condition dependent on a predetermined force;

wherein the focus element and menu items are locally shifted relative to each other discretely by one menu item if the comparison of the second control signal and the predetermined condition corresponds to an actuation force greater than the predetermined force; and wherein the focus element and menu items are shifted relative to each other depending on the degree of deflection of the actuation device if the comparison of the second control signal and the predetermined condition corresponds to an actuation force that is smaller than the predetermined force.

2. The method according to claim 1, wherein the actuation device is a button on the remote control.

3. The method according to claim 1, wherein the focus element and menu items are shifted relative to each other depending on the degree of deflection of the actuation device if the comparison of the second control signal and the predetermined condition corresponds to an actuation force that is smaller than the predetermined force.

4. The method according to claim 1, wherein dependence of the displacement of the focus element and menu items relative to each other by the comparison of the second control signal and the predetermined condition is dependent on length of time of the deflection.

5. The method according to claim 1, wherein the shift of the focus element and menu items relative to each other occurs dependent on the comparison of the second control signal and the predetermined condition after a predetermined length of time of the deflection.

6. The method according to claim 4, wherein the second control signal is derived from the first control signal.

7. The method according to claim 1, wherein the focus element and menu items are shifted relative to each other depending on the degree of deflection of the actuation device if the comparison of the second control signal and the predetermined condition corresponds to an actuation force that is smaller than the predetermined force.

8. The method according to claim 2, wherein dependence of the displacement of the focus element and menu items relative to each other by the comparison of the second control signal and the predetermined condition is dependent on length of time of the deflection.

9. The method according to claim 2, wherein the shift of the focus element and menu items relative to each other occurs dependent on the comparison of the second control signal and the predetermined condition after a predetermined length of time of the deflection.

10. The method according to claim 8, wherein the second control signal is derived from the first control signal.

11. The method according to claim 1, wherein:
the actuation device is a button on the remote control;
dependence of the displacement of the focus element and menu items relative to each other can be changed in terms of time by the comparison of the second control signal and the predetermined condition;

the shift of the focus element and menu items relative to each other after expiration of a predetermined length of time occurs dependent on the comparison of the second control signal and the predetermined condition; and the second control signal is derived from the first control signal.

\* \* \* \* \*